United States Patent [19]

Nugent, Jr. et al.

[11] Patent Number: 5,489,455

[45] Date of Patent: * Feb. 6, 1996

[54] CONTAINER WITH POLYAMINE-POLYEPOXIDE GAS BARRIER COATING

[75] Inventors: Richard M. Nugent, Jr.; Ken W. Niederst, both of Allison Park; Jerome A. Seiner, Pittsburgh, all of Pa.

[73] Assignee: PPG Industries, Inc., Pittsburgh, Pa.

[*] Notice: The portion of the term of this patent subsequent to Apr. 9, 2008, has been disclaimed.

[21] Appl. No.: 168,286

[22] Filed: Dec. 17, 1993

Related U.S. Application Data

[60] Division of Ser. No. 767,458, Sep. 30, 1991, Pat. No. 5,300,541, which is a continuation-in-part of Ser. No. 656,662, Feb. 19, 1991, abandoned, which is a division of Ser. No. 367,992, Jun. 19, 1989, Pat. No. 5,008,137, which is a continuation of Ser. No. 152,176, Feb. 4, 1988, abandoned.

[51] Int. Cl.$^6$ ............................................. B29D 22/00
[52] U.S. Cl. .................. 428/36.91; 428/36.6; 428/36.7; 428/36.9
[58] Field of Search ............................. 523/404, 414, 523/420, 428, 456; 525/437, 438, 447, 449, 523, 525, 526, 529, 532, 533; 428/36.6, 36.7, 36.9, 36.91; 528/119, 120, 123, 36.6

[56] References Cited

U.S. PATENT DOCUMENTS

| | | | |
|---|---|---|---|
| 2,500,600 | 3/1950 | Bradley | 260/47 |
| 2,640,037 | 5/1953 | Parry et al. | 260/42 |
| 2,651,589 | 9/1953 | Shokal et al. | 154/140 |
| 2,830,721 | 4/1958 | Pinsky et al. | 215/1 |
| 2,909,448 | 10/1959 | Schroeder | 117/141 |
| 3,129,133 | 4/1964 | Doyle et al. | 162/164 |
| 3,256,239 | 6/1966 | Williamson et al. | 428/36.6 |
| 3,294,574 | 12/1966 | Salame | 117/94 |
| 3,337,609 | 8/1967 | Williamson et al. | 260/482 |
| 3,393,087 | 7/1968 | Kamp et al. | 117/26 |
| 3,399,162 | 8/1968 | Salame | 523/456 |
| 3,496,138 | 2/1970 | Sellers et al. | 260/47 |
| 3,553,283 | 1/1971 | Doss | 260/830 |
| 3,963,663 | 6/1976 | Sekmakas | 260/29.3 |
| 4,093,594 | 6/1978 | Anderson | 260/47 |
| 4,116,900 | 9/1978 | Belanger | 260/18 |
| 4,246,148 | 1/1981 | Shimp et al. | 260/18 |
| 4,304,700 | 12/1981 | Shimp et al. | 428/418 |
| 4,423,166 | 12/1983 | Moriarity et al. | 523/414 |
| 4,507,363 | 3/1985 | Chow et al. | 428/418 |
| 4,528,219 | 7/1985 | Yamada et al. | 428/35 |
| 4,536,425 | 8/1985 | Hekal | 428/35 |
| 4,540,750 | 9/1985 | Ham | 525/504 |
| 4,704,437 | 11/1987 | Kiessling | 528/123 |
| 4,719,135 | 1/1988 | Gerdes et al. | 428/35 |
| 4,725,457 | 2/1988 | Ward et al. | 427/385.5 |
| 4,741,936 | 5/1988 | Nohar et al. | 428/35 |
| 4,764,405 | 8/1988 | Bauman et al. | 428/36.6 |
| 4,891,408 | 1/1990 | Newman-Evans | 525/113 |
| 5,006,381 | 4/1991 | Nugent, Jr. et al. | 428/36.6 |
| 5,008,137 | 4/1991 | Nugent, Jr. et al. | 428/36.6 |

FOREIGN PATENT DOCUMENTS

| | | |
|---|---|---|
| 177444 | 4/1986 | European Pat. Off. . |
| 193685 | 9/1986 | European Pat. Off. . |
| 224042 | 6/1987 | European Pat. Off. . |
| 1912485 | 11/1969 | Germany . |
| 1258454 | 12/1971 | United Kingdom . |

OTHER PUBLICATIONS

Kirk–Othmer, Encyclopedia of Chemical Technology, 3rd Edition, "Barrier Polymers", vol. 3, 480–502.
Salame, "Permeability of Plastics: Inherent Limitation or Not?", Problem Solving Plast., Compilation Pap. Symp. 1971, pub.: Nat. Assn. Corros. Eng., 82–86.
Chemical Abstracts, vol. 101, (1984) 132125h.
Salame, Polymer Engineering and Science, vol. 26, No. 22, "Prediction of the Gas Barrier Properties of High Polymers", pp. 1543–1546 (1986).

*Primary Examiner*—Robert E. Sellers
*Attorney, Agent, or Firm*—Dennis G. Millman; Paul S. Chirgott

[57] ABSTRACT

A container is composed of one at least one layer of a gas-permeable polymeric material such as a polyolefin, polycarbonate or a polyester and at least one layer of a polymeric gas barrier material containing at least seven percent by weight of amine nitrogen derived from the reaction product of a polyamine and a polyepoxide.

8 Claims, No Drawings

CONTAINER WITH POLYAMINE-POLYEPOXIDE GAS BARRIER COATING

RELATED APPLICATIONS

This application is a divisional of application Ser. No. 07/767,458, filed Sep. 30, 1991, now U.S. Pat. No. 5,300, 541, which was a continuation in part of U.S. patent application Ser. No 07/656,662 filed Feb. 19, 1991, now abandoned, which is a divisional of U.S. application Ser. No. 07/367,992, filed Jun. 19, 1989, now U.S. Pat. No. 5,008, 137, which was a continuation of U.S. Ser. No. 07/152,176 filed Feb. 4, 1988, now abandoned.

BACKGROUND OF THE INVENTION

The present invention relates to barrier materials, curable coating compositions for forming such materials, and to packaging materials and/or containers including barrier materials. The barriers substantially reduce the permeability of gases such as carbon dioxide and/or oxygen through packaging materials.

Plastics have found increasing use as replacements for glass and metal containers in packaging, especially of foods and beverages. The advantages of such plastic packaging includes lighter weight, decreased breakage (versus glass) and potentially lower costs. However, shortcomings in the gas-barrier properties of common packaging plastics, such as polyolefins, e.g., polyethylene and polypropylene, poly(ethylene terephthalate) and polycarbonates, present major disadvantages in the packaging of many foods and beverages. For example, many foods and beverages are sensitive to oxidation and must be protected from oxygen to prevent discoloration or other detrimental effects. Further, plastic beverage containers suffer comparative shelf-life problems versus glass or metal due to the loss of carbon dioxide through the plastic container.

Numerous barrier coatings have been developed including, e.g., barrier materials based on thermoplastic, crystalline resins such as vinylidene chloride or ethylene-vinyl alcohol. Each of these materials have drawbacks. Ethylene-vinyl alcohol-based polymers lose barrier properties upon exposure to water, and packages of this material cannot generally undergo retort, i.e., heating under pressurized steam for pasteurization without loss of barrier performance. Vinylidene chloride-based polymers have been recognized as having excellent gas-barrier properties, but preparation of such vinylidene chloride-based polymers must generally be done under high pressure. Further, since vinylidene chloride-based barrier materials include halogen atoms, the disposal of such materials via incineration poses environmental problems. In addition, both vinylidene chloride-based polymers and ethylene-vinyl alcohol based polymers exhibit loss of adhesion after undergoing retort.

U.S. Pat. No. 2,830,721 (Pinsky et al.) discloses a polyamine-polyepoxide barrier coating for plastic containers. The purpose is to reduce the permeation of organic solvents through polyethylene containers. For polymeric food and beverage containers, it would be desirable to provide barrier coatings that have lower oxygen and/or carbon dioxide permeabilities than those disclosed in the Pinsky et al. patent.

SUMMARY OF THE INVENTION

The present invention concerns barrier coatings having exceptionally low oxygen and/or carbon dioxide permeabilities which are suitable for use on polymeric containers and other packaging materials. Such barrier coatings are based on a polymeric reaction product of polyamine and polyepoxide. It has been discovered that the permeability of this type of barrier coating can be significantly reduced by enhancing the amine nitrogen content of the polyamine-polyepoxide reaction product. The barrier coating polymers of the present invention are characterized as containing at least about seven percent by weight amine nitrogen based on total weight of the polymer. Exceptionally good barrier properties were found to be attained at amine nitrogen contents of at least ten percent. (Weight percents herein are expressed on the basis of solid resin content.) The expression "amine nitrogen" is intended to exclude other nitrogen containing groups such as amides and urethanes.

In addition to the amine nitrogen content of the polyamine-polyepoxide reaction product, a secondary factor in reducing permeability of the coatings of the present invention is the hydroxyl group content of the polyamine-polyepoxide reaction product. Hydroxyl group content of at least 6 percent by weight of the reaction product has been found to be beneficial. Even better barrier properties have been attained with hydroxyl group contents of at least 10 percent. At the higher hydroxyl group contents, it has been found possible to obtain good barrier properties with smaller amounts of amine nitrogen in the reaction product, provided that the total of the hydroxyl group content and the amine nitrogen content is at least 17 percent.

When cured, the coatings of the present invention have been found to exhibit oxygen permeability of less than about 1.5 cc-mil/100 in$^2$-day-atmosphere. In preferred embodiments, oxygen permeability of less than about 1.0 and most preferably less than about 0.5 cc-mil/100 in$^2$-day-atmosphere can be achieved. Low carbon dioxide permeability may be attained by the barrier coatings of the present invention instead of or in addition to the low oxygen permeability, although both properties tend to decrease with increasing amine nitrogen and/or hydroxyl content of the coating polymer. Carbon dioxide permeability of less than about 15 cc-mil/100 in$^2$-day-atmosphere (measured at 23° C. and zero percent relative humidity) has been attained by barrier coatings of the present invention. Preferred embodiments exhibit carbon dioxide permeability of less than about 3 and most preferably less than about 1.00 cc-mil/100 in$^2$-day-atmosphere.

The polyamine-polyepoxide polymers that comprise the chief film-forming resin of the barrier coatings of the present invention are cured in situ from two components that are mixed immediately prior to application onto a plastic substrate. In one embodiment of the invention, the polyamine comprises one component and the polyepoxide comprises the other component. In another embodiment, one of the components may comprise a prereacted adduct of the polyamine with some of the polyepoxide, and the other component comprises polyepoxide to complete the reaction. Both embodiments have distinct advantages.

In the embodiment involving prereacted adduct, the adduct is provided by the reaction of a polyamine having up to about two primary amino nitrogen groups per molecule and a polyepoxide. Thereafter, the adduct is reacted with additional polyepoxide to form the barrier coating. Forming the adduct by a preliminary reaction has the advantage of increasing molecular weight while maintaining linearity of the resin product, thereby avoiding gellation. Using a polyamine having no more than two primary amino groups to make the adduct serves to avoid gellation in this embodiment. Additionally, the usual time period required for ingestion of epoxy and amine reactants before application onto a substrate is reduced or eliminated by the prereaction of the adduct.

Not all of the embodiments of the invention require the step of prereacting an adduct. It has now been found that excellent barrier coatings having at least seven percent amine nitrogen can be produced without the step of prereacting polyamine and polyepoxide to form an adduct. Instead, substantially all of the polyepoxide required for the coating may be blended with the polyamine, and after allowing for an ingestion period, may be applied to the substrate and cured in place. Not only is a prereaction step eliminated, but advantages have been found for directly blending polyamine and polyepoxide to polymerize to a coating. This embodiment permits the use of higher resin solids content in the coating composition (preferably greater than 50 percent) and correspondingly lower volatile organic solvent content. Not only is the lower organic solvent content desirable from an environmental standpoint, but higher solids content is advantageous for providing adequate coating thickness on high speed coating lines.

Additional advantages result from the non-prereacted embodiments of the present invention. Higher solids content is accompanied by lower molecular weight, which yields advantages in the type of solvents that can be used in the coating compositions. The flow properties of a composition comprising a relatively low molecular weight resin are inherently better, thereby permitting the use of solvents that evaporate faster. The more rapidly evaporating solvents, in turn, are more readily removed from the coating during the baking step after application onto the plastic substrate, thereby reducing entrapment of solvent during final curing that may detrimentally affect the barrier properties of the coating.

Amine nitrogen content of the reaction products of the present invention has been found to relate directly to the barrier properties of the coating composition. It is expedient to use polyamines that have greater than the amount of amine nitrogen intended for the final polymer since reaction with the polyepoxide will dilute the amine nitrogen content. Therefore, the polyamine preferably has a plurality of secondary and/or tertiary amines in addition to the primary amine groups that are the predominant reaction site for the reaction with the epoxy groups. In some embodiments of the invention it has been found possible to further increase the amine nitrogen content of the reaction product by using as the polyepoxide reactant a polyepoxide having at least one amine group. Thus the polyepoxide contributes some amine to the final polymer rather than only diluting the amine content. The amine-containing polyepoxide may be used to produce the prereacted adduct or as the curing agent to react with the entire polyamine component. Using these preferred techniques, amine nitrogen content of the reaction products can be made higher than 10 percent, and in some cases as high as 14 percent or greater, in which cases excellent barrier properties were found to be exhibited, particularly with respect to carbon dioxide.

Increasing hydroxyl group content of the polyamine-polyepoxide reaction products of the present invention has also been found to improve the barrier properties. Reaction of the epoxy groups of the polyepoxides normally produces hydroxyl groups, but this aspect of the invention contemplates the use of particular reactants to provide additional hydroxyl content to the reaction products beyond that normally resulting from the epoxy reactions. One approach is to employ a hydroxyl containing epoxide such as glycidol. Another approach is to react an alkanolamine with a polyepoxide having more than two epoxy groups per molecule in a preliminary step to react with some of the epoxy groups, leaving sufficient epoxy functionality to permit subsequent reaction with the polyamine. The alkanolamines add not only hydroxyl groups to the reaction product, but also additional amines. Yet another approach is to react the prereacted polyamine-polyepoxide adduct with a polyepoxide having more than two epoxy groups per molecule. In preferred embodiments, a polyepoxide having more than two epoxy groups per molecule that also includes amine groups is employed, thereby permitting the hydroxyl content of the barrier film to be increased without substantially diluting the amine nitrogen content. In the basic embodiments of the present invention, the polymeric barrier material typically exhibits a hydroxyl content of about 6 weight percent based on the total weight of the polymeric barrier material. Enhancements of the hydroxyl content in accordance with preferred embodiments may increase the hydroxyl content to at least 10 weight percent.

One aspect of the preferred embodiments of the invention involves use of polyepoxides having more than two epoxy groups per molecule to produce polyamine-polyepoxide barrier coatings. As previously mentioned, additional epoxy groups provide sites for reaction with amine containing and/or hydroxyl containing compounds, such as the alkanolamines mentioned above, while retaining sufficient unreacted epoxy groups for crosslinking. Alternatively, polyepoxides having more than two epoxy groups per molecule may be used to produce the prereacted adduct, wherein a portion of the epoxy groups are initially reacted with an amine containing and/or hydroxyl containing compound (preferably an alkanolamine) before reaction with a polyamine to form the adduct. For the sake of contributing to the amine nitrogen content of the barrier coating while providing the advantages of higher epoxy functionality, it is preferred that the polyepoxides having more than two epoxy groups per molecule also include amine groups. Barrier coatings in accordance with the present invention in which the polyepoxide includes more than two epoxy groups per molecule and also includes amine groups have been found to have improved resistance to carbonating, i.e., to deteriorate due to exposure to carbon dioxide and water vapor in air. Additionally, as curing agents for reacting with polyamines in the present invention, the higher functional epoxies produce higher crosslink density in the resulting films. Higher crosslink density is associated with better abrasion resistance and water resistance.

Additional improvements have been found to be yielded by including small amounts of water in the final reaction mixture of polyamines and polyepoxides. Not only does the water serve the expected function of accelerating the curing rate, but also the barrier properties of the resulting film surprisingly are substantially improved, particularly with regard to carbon dioxide.

It is an additional advantage that the cured barrier coatings of the present invention are thermosetting polymers. This is preferred for food and beverage containers so that rubbing of adjacent containers during transit does not cause localized softening of the barrier coatings and possible damage to the coating. The cured barrier coatings of the present invention are also characterized as being relatively moisture insensitive.

In further accordance with the present invention, a packaging material is provided which includes at least one layer of a relatively gas-permeable polymeric material and at least one layer of a polyamine-polyepoxide barrier material characterized as containing at least about seven percent by weight amine nitrogen, based on total weight of the barrier material. The composite packaging material exhibits oxygen permeability of less than about 1.5 cc-mil/100 in$^2$-day-atmosphere and carbon dioxide permeability of less than about 15 cc-mil/100 in$^2$-day-atmosphere at 23° C. and zero percent relative humidity. The barrier material included in the packaging material is a film produced by applying to the polymeric material the coating compositions described above. Containers may be formed from this composite packaging material.

In still another aspect of the present invention, a container is provided which includes at least one layer of a relatively gas-permeable polymeric material and at least one layer of the barrier coating as previously described.

DETAILED DESCRIPTION OF THE INVENTION

By the term "barrier material" as used throughout this description is meant that such a material has a low permeability to gases such as oxygen and/or carbon dioxide, i.e., the material exhibits a high resistance to the passage of oxygen or carbon dioxide through the material. Permeation through a material is a function of the thickness of the material. The barrier materials of the present invention exhibit a combination of relatively high resistance to both carbon dioxide and oxygen, but many applications do not require resistance to both. Therefore, low permeability to either carbon dioxide or oxygen as defined below is sufficient to qualify the material as a "barrier material." Embodiments of barrier materials of the present invention intended primarily as oxygen barriers exhibit an oxygen permeability of less than about 1.5, preferably less than about 1.0, and more preferably less than about 0.5 measured as cubic centimeters of oxygen gas permeating a one-mil thick sample, 100 inches square over a 24-hour period under an oxygen partial pressure differential of one atmosphere at 23° C. and at a relative humidity of zero. Barrier materials of the present invention intended primarily as carbon dioxide barriers exhibit a carbon dioxide permeability of less than about 15.0, preferably less than about 5.0, and more preferably less than about 2.0 measured as cubic centimeters of carbon dioxide gas permeating a one-mil thick sample, 100 inches square over a 24-hour period under a carbon dioxide partial pressure differential of one atmosphere at 23° C. and at a relative humidity of zero. Generally, it has been found that as the amount of amine nitrogen in a barrier material increases, gas permeability decreases. Barrier materials having at least about seven percent by weight amine nitrogen can generally be further characterized as exhibiting the permeability levels described above with regard to oxygen and/or carbon dioxide In addition, it may sometimes be considered advantageous for barrier materials also to have low permeabilities to organic liquids and solvents, e.g., gasoline, toluene, methylene chloride, methyl ethyl ketone, methanol and the like.

A wide variety of polyepoxides may be utilized to react with polyamines to form the barrier coating composition of the present invention. The polyepoxides may be saturated or unsaturated, aliphatic, cycloaliphatic, aromatic, or heterocyclic and may be substituted, if desired, with noninterfering substituents such as hydroxyl groups or the like.

Examples of useful polyepoxides are polyglycidyl ethers of aromatic polyols, e.g., polyphenols. Such polyepoxides can be produced, for example, by etherification of an aromatic polyol with epichlorohydrin or dichlorohydrin in the presence of an alkali. The aromatic polyol may be, e.g., bis(4-hydroxyphenyl)-2,2-propane (generally known as bisphenol A), bis(4-hydroxyphenyl)-1,1-ethane, bis(4-hydroxyphenyl)-1,1-isobutane, bis(4-hydroxytertiarybutylphenyl)-2,2-propane, bis(2-hydroxynaphthyl)methane, 4,4'-dihydroxybenzophenone, 1,5-dihydroxy-naphthalene and the like. Bisphenol A is the preferred aromatic polyol in preparation of the polyepoxide.

Also suitable as the polyepoxide are polyglycidyl ethers of polyhydric aliphatic alcohols such as 1,2-ethanediol, 1,2-propanediol, 1,3-propanediol, 1,4-butanediol, 1,5-pentanediol, diethylene glycol, triethylene glycol, polyethylene glycol, polypropylene glycol and the like. Similarly, the polyhydric aliphatic alcohols may be a hydrogenated polyphenol such as 2,2-bis(4-hydroxycyclohexyl)propane and the like. The polyglycidyl ether of 1,4-butanediol is preferred from among those of polyhydric alcohols. Blends of various polyepoxides, e.g., blends of polyepoxides of aromatic polyols and aliphatic polyols, may also be used.

Generally, the polyepoxides usually have molecular weights above about 86, preferably from about 200 to about 700, and more preferably from about 200 to about 400, and have epoxy equivalent weights of above about 43, preferably from about 100 to about 350, and more preferably from about 100 to about 200. The equivalent weight of the polyepoxide is preferably minimized thereby increasing the amine nitrogen content of the resultant barrier material.

Further, a blend of a monoepoxide and a polyepoxide may be reacted informing the ungelled amine-functional polymeric resin or a monoepoxide can be reacted with the ungelled polymeric resin after its preparation from a polyamine and a polyepoxide thereby reducing the amount of amine functionality of the resin. Suitable monoepoxides include monoepoxides such as, e.g., a $C_{16}$ alpha olefin epoxide, 2-ethylhexylglycidyl ether, butylglycidyl ether, cresyl glycidyl ether, phenyl glycidyl ether (1,2-epoxy-3-phenoxypropane), propylene oxide, ethylene oxide, glycidol (2,3-epoxy-1-propanol) and the like.

Preferably, the polyepoxide used in forming the reaction product has an average 1,2-epoxy functionality of at least about 1.4 and most preferably about 2.0 or greater, i.e., the polyepoxide is a diepoxide. The diglycidyl ethers of an aromatic polyol such as bisphenol A or an aliphatic alcohol such as 1,4-butanediol are the suitable polyepoxides to react with the polyamine. Trifunctional and tetrafunctional polyepoxides are also useful in the present invention, and particularly advantageous are those that include amine groups, thereby increasing the amine nitrogen content of the barrier coating. Examples of amine-containing tetrafunctional polyepoxides include N,N,N',N' tetrakis (oxiranylmethyl) 1,3 benzene dimethanamine (available as "TETRAD X" from Mitsubishi Gas Chemical Co.); N,N,N',N' tetrakis (oxiranylmethyl) 1,3 cyclohexane dimethanamine (available as "TETRAD C" from Mitsubishi Gas Chemical Co.); and tetra glycidyl bis(para-amino phenyl) methane (available as "MY-720" from Ciba-Geigy). Other amine-containing polyepoxides include diglycidyl aniline and triglycidyl aminophenol.

Polyoxalates or other suitable polycarboxalates may function in a manner similar to polyepoxide in the context of the present invention. Accordingly, although polyepoxides are preferred, polyoxalates and some other polycarboxalates may be considered as equivalent to polyepoxides and should not be considered as being precluded from the scope of the invention by the use of the term "polyepoxide" herein. Among polyoxalates that may be considered for use in the present invention as a partial or entire substitute for polyepoxide are poly(diallyl oxalate), poly(hexanediol oxalate), poly(ethylene oxalate), poly(tetramethylene oxalate), diethyl oxalate-ethylene glycol polymer, poly(trimethylene oxalate), poly(vinyl oxalate), polyethylene glycol oxalate and the like. Further, the esters of oxalic acid, such as diethyl oxalate, dibutyl oxalate and the like, are considered to be useful "polyoxalates" as the term is used herein. Esters of other dicarboxylic acids, such as malonic acid, succinic acid and the like, may also be utilized in the compositions as long as the final product contains the sufficient level of amine nitrogen.

The polyamine used in reacting with the polyepoxide generally has up to about two primary amino nitrogen groups per molecule but preferably may also have secondary or tertiary amino nitrogen groups. Polyamines with less than two primary amino nitrogen groups per molecule may be used so long as sufficient secondary amino nitrogen groups are present. Preferred polyamines include aliphatic polyamines of the formula $(R-)_2N-R(NH-R)_nN(R')_2$ wherein R is a $C_2$ to $C_6$ alkylene group, preferably a $C_2$ to $C_4$ alkylene group such as ethylene, isopropylene and the like, R' is a hydrogen, a lower alkyl group such as methyl, ethyl and the like, or a hydroxyalkyl group wherein the alkyl group contains from about one to four carbon atoms, and n is an integer from 0 to about 10, preferably from about 1 to about 5 with the proviso that the polyamine contains at least three secondary or primary amine hydrogens. Suitable examples of such polyamines include ethylenediamine, diethylenetriamine, triethylenetetramine, tetraethylenepentamine, N-hydroxyethyl ethylenediamine, N-hydroxyethyl diethylenetriamine, N,N-dihydroxyethyl diethylenetriamine and the like. The polyamine may also be an aromatic polyamine such as para-diaminobenzene, 4,4'-diaminophenylaniline and the like. The polyamine may also be a ketone blocked polyamine, sometimes referred to as a kerimine, e.g., a polyamine, such as tetraethylenepentamine, may be reacted with a ketone, such as methyl isobutyl ketone and the like, to give a polyamine having the primary amine groups blocked and three remaining reactive secondary amine groups. Diprimary amine group-containing polyamines are generally preferred, triethylenetetramine and tetraethylenepentamine are more preferred polyamines, and tetraethylenepentamine is the most preferred polyamine in the reaction to form the ungelled amine-functional polymeric resin.

Ammonia may also be a precursor to a suitable polyamine, e.g., two moles of ammonia may be reacted with one mole of a suitable diepoxide, such as a diglycidyl ether of bisphenol A, to produce a diprimary amine-functional material useful in forming the resin of the present invention. The polyamine may also be polyethyleneimine and the like. Still further, the polyamine may also be a polyoxyalkylene-polyamine such as the material described in U.S. Pat. No. 4,423,166 for preparation of an ungelled material used in electrodeposition. The resultant ungelled resin should contain the sufficient amine nitrogen content. Preferably, such a product of a polyoxyalkylene-polyamine and, e.g., a polyepoxide, may derive from polyamines including greater than two amine nitrogen groups per molecule but only up to about two primary amino nitrogen groups per molecule.

The polymeric resins of the present invention as well as the polyepoxide and polyamine reactants from which they are made preferably have minimal content of extraneous groups that would dilute the amine nitrogen content or hydroxyl content of the barrier coating on a percent weight basis. For example, the reactants and the polymers of the present invention are preferably free of oxyalkylene moieties and other extraneous moieties. Extraneous groups whose inclusion is preferably avoided include any group other than amine, hydroxyl, or epoxy. Excessively long chain alkyl groups are also preferably avoided for the same reason.

A polyacrylate may be used in forming the prereacted adduct, i.e., an ungelled amine-functional polymeric resin. Such a polyacrylate may be a polyacrylate ester of a polyol or a polymethacrylate ester of a polyol, such esters containing at least two terminal acrylate or methacrylate groups per molecule. Such esters include the acrylic acid and methacrylic acid esters of aliphatic polyhydric alcohols, preferably dihydric alcohols. Such alcohols may be, e.g., alkylene glycols such as 1,2-ethanediol, 1,3-propanediol, 1,4-butanediol, 1,6-hexanediol and the like, or polyalkylene glycols such as diethylene glycol, triethylene glycol, tetraethylene glycol and the like. Typical compounds include, e.g., 1,4-butanediol diacrylate, 1,4-butanediol dimethacrylate, 1,6-hexanediol diacrylate, 1,6-hexanediol dimethacrylate, triethylene glycol diacrylate, triethylene glycol dimethacrylate and the like.

The reactive sites on the polyamines for reacting with the polyepoxides are the active amine hydrogens. In general, the amounts of the reactants may be chosen so as to provide a ratio of active amine hydrogens in the polyamine to epoxy groups in the polyepoxide in a ratio that ranges from 1:0.1 to 1:1 on a molecular weight basis. Preferably the ratio ranges from 1:0.2 to 1:0.8. Maximizing the amount of polyamine is generally desirable for the sake of maximizing the amine nitrogen content of the barrier coating, but insufficient numbers of epoxy groups may not provide enough crosslinking to yield a strong, moisture resistant, solvent resistant film. Larger numbers of epoxy groups could in theory be used, but to do so would be contrary to the objective of maximizing the amine nitrogen content of the barrier coating since the excess epoxy would dilute the amine nitrogen content of the product. Also, the use of more epoxy than required can produce excessive crosslinking and a film that is too brittle. Even in the embodiments that use amine-containing polyepoxides, the amine nitrogen content of the polyepoxide is usually lower than that of the polyamine, so that excessive use of that polyepoxide would still tend to dilute the amine nitrogen content of the product. In those embodiments in which the polyamine is prereacted with a portion of the polyepoxide to form an adduct, approximately 10 to 80 percent, preferably 20 to 50 percent, of the active amine hydrogens of the polyamine may be reacted with epoxy groups during formation of the adduct. Prereacting fewer of the active amine hydrogens reduces the effectiveness of the prereaction step and provides little of the linearity in the polymer product that is one of the advantages of forming the adduct. Prereacting larger portions of the active amine hydrogens is not preferred because sufficient active amine hydrogen groups must be left unreacted so as to provide reaction sites for reacting with the remainder of the polyepoxide during the final curing step. Furthermore, in making the adduct it is also desirable to minimize the amount of polyepoxy used in order to avoid diluting the amine nitrogen content of the final polymer.

Those embodiments that include a polyacrylate or polyoxalate in the composition are preferably reacted at or near stoichiometric ratios of active amine hydrogens to epoxy groups.

In forming the barrier coating from the reaction of an adduct with a polyepoxide, the two components are preferably reacted together at a ratio of active amine hydrogens to epoxy groups of from about 1:0.1 to about 1:1, more preferably from about 1:0.2 to about 1:0.85, most preferably from about 1:0.3 to about 1:0.7. That is, the barrier material can include up to one epoxy equivalent per one amine equivalent. Each amine hydrogen of the amine-functional adduct is theoretically able to react with one epoxy group and is considered as one amine equivalent. Thus, a primary amine nitrogen is considered as difunctional in the reaction with polyepoxides to form the barrier material. Preferably, the reaction product contains an excess of amine hydrogen equivalents over epoxy equivalents, which provides the advantage of keeping the weight percentage of amine nitrogen in the reaction product higher thereby providing lower gas permeabilities. As stated before, the use of larger amounts of epoxy is not strictly precluded but generally is counterproductive. On the other hand, providing fewer epoxy groups during the curing stage may not yield sufficient crosslinking to produce a durable film.

Preparation of a prereacted adduct, comprising an ungelled, amine-functional, polymeric resin involves the slow addition of the polyepoxide, preferably a dilute polyepoxide solution, to a dilute polyamine solution at temperatures and over time sufficient to form the ungelled amine-functional polymeric resin. Preparation of such an ungelled amine-functional polymeric adduct is described in commonly assigned application Ser. No. 07/375,659, entitled "Ungelled Polyamine-Polyepoxide Resins" by Nugent et al., filed on Jun. 30, 1989, now U.S. Pat. No. 5,006,381, and the description of the preparation of such an ungelled resin is incorporated herein by reference. The reaction of the polyepoxide and the polyamine to give the ungelled adduct is carried out at temperatures and concentrations of reactants sufficient to obtain the ungelled product and may vary depending upon selection of starting materials. Generally, reaction temperatures may vary from about 40° C. to 140° C., with lower temperatures (40° C. to 110° C.) being preferred for systems susceptible to gelation. Similarly, concentrations of reactants may vary from neat to as low as five percent by weight of reactant in an appropriate solvent depending upon the particular molar ratio and type of reactants. Lower concentrations will generally be required for systems susceptible to gelation. Specific reaction conditions may be readily chosen by one skilled in the art.

The ungelled amine-functional polymeric adducts are described throughout this specification as containing an average of greater than two polyamine moieties within said resin. By "polyamine moiety" is meant that portion of a polyamine molecule which remains after reaction with the polyfunctional material. Thus, the ungelled polymeric resins contain an average of greater than two separate polyamine portions. An example would be the product of four moles of a diprimary amine-containing polyamine reacted with three moles of a diepoxide, such a product containing an average of about four polyamine moieties.

By the term "ungelled" as used throughout this description is meant that such an amine-functional polymeric resin is a soluble or dispersible reaction product, the resin being fluid under processing conditions of the present invention.

With the prereacted adduct approach, additional polyepoxide can be reacted with the adduct to give a cured thermoset product. Generally, such a polyepoxide may be the same as those polyepoxides previously described for forming the adduct. Polyoxalates may be utilized to react with the adduct instead of polyepoxides to give the cured product, the polyoxalates containing at least two reactive functional groups. Such polyoxalates may be the same as those described for prereaction to form the ungelled adduct.

A monoepoxide, such as a $C_{16}$ alpha olefin epoxide, 2-ethylhexylglycidyl ether, butylglycidyl ether, cresyl glycidyl ether, phenyl glycidyl ether (1,2-epoxy-3-phenoxypropane), propylene oxide, ethylene oxide, glycidol (2,3-epoxy-1-propanol) and the like, may also be included with the polyepoxide or polyoxalate in the coating compositions as long as a sufficient amount of polyepoxide or polyoxalate is also present to provide for crosslinking and cure upon heating.

While certain advantages are obtained from prereacting polyamine with polyepoxide to form an adduct, other advantages result from a single step reaction of polyamine with all of the polyepoxide required to form the barrier coating of the present invention. In this embodiment, molecular weights of the resins are kept relatively low, thereby providing relatively low viscosity without requiring as much solvent. As a result, compositions suitable for application by spraying or roll coating can be provided with low volatile organic content (VOC). Barrier coating compositions can be provided by this embodiment having solids contents greater than 50 percent by weight, typically in the range of 50 to 70 percent solids, although even higher solids contents are possible. If the polyepoxide and polyamine reactants are sufficiently low in molecular weight, solvents may be omitted. Another advantage is that it is believed that better barrier properties may be attainable with coating compositions having lower solvent content due to lower tendency to trap solvent in the cured film. This is also aided by the ability to use faster evaporating solvents in this embodiment. High solids compositions are also an advantage for the sake of attaining the desired coating thickness in less time on high speed coating lines. Inclusion of a flow control agent such as the siloxanes disclosed herein is preferred in the high solids embodiments to assure pin hole free coatings.

In the one-step reaction embodiment, no substantial prereaction is involved, but initiation of the reaction of the polyepoxide with the polyamine is delayed during an ingestion period of about 30 to 60 minutes at room temperature following mixing of the two reactive components and before the composition is applied onto the substrate. Some minor reaction may occur during this ingestion period, but the time delay is required before significant reaction takes place. After the ingestion period the mixture has a pot life typically on the order of 1 to 2 hours before it hardens, depending upon the particular composition. Curing times and temperatures are essentially the same for this embodiment as for the adduct embodiments.

Solvents for use in the composition of the present invention must be compatible with the plastic substrates being coated and should be chosen so as to provide desirable flow properties to the liquid composition upon application. Suitable solvents for use with the compositions of the present invention are preferably oxygenated solvents, such as glycol ethers, e.g., 2-methoxyethanol, 2-ethoxyethanol, 2-propoxyethanol, 2-butoxyethanol, 1-methoxy-2-propanol and the like, or alcohols such as methanol, ethanol, propanol and the like. Glycol ethers, such as 2-butoxyethanol and 1-methoxy-2-propanol, are more preferred with 1-methoxy-2-propanol being most preferred. The use of 1-methoxy-2-propanol is preferred for its lower flash point, which minimizes solvent retention in the cured film, and its use is particularly suitable with the embodiments involving relatively low molecular weight reactants, particularly those not involving a prereacted adduct. In order to obtain desired flow characteristics in some of the embodiments using a prereacted adduct, use of 2-butoxyethanol may be preferred. In embodiments not requiring slow evaporating solvents for the sake of flow properties, the solvents listed here may be diluted with less costly solvents such as toluene or xylene. The solvent may also be a halogenated hydrocarbon, for example, a chlorinated hydrocarbon, such as methylene chloride, 1,1,1-trichloroethane and the like (usually considered fast evaporating solvents), may be especially useful in obtaining cured barrier films. Mixtures of such solvents may also be employed. Non-halogenated solvents are preferred where the resultant barrier material is desired to be halide-free. The resin may also be in an aqueous medium, i.e., the ungelled amine-functional polymeric resin may be an aqueous solution or dispersion. For example, when the polyepoxide used in forming the reaction product is a water-soluble polyepoxide, e.g., the polyglycidyl ether of an aliphatic diol such as butanediol, the ungelled amine-functional polymeric resin can be utilized as an aqueous solution. Otherwise, with water-insoluble polyepoxides, the ungelled amine-functional polymeric resin can have sufficient amine groups neutralized with an organic acid, such as formic acid, lactic acid, or acetic acid, or with an inorganic acid, such as hydrochloric acid or phosphoric acid, to allow solubilization of the ungelled amine-functional polymeric resin in an aqueous medium. An organic acid is preferably used.

Reaction of a polyepoxide and a polyamine produces resin polymers having a plurality of amine and hydroxyl functionalities, both of which appear to contribute to the barrier properties attained by the present invention. Thus, selecting the polyepoxide and polyamine reactants in order to maximize the amine and hydroxyl functionalities is generally desirable, but increasing the content of one without decreasing the content of the other can be a problem. One approach is to select polyamine and polyepoxide reactants having relatively large numbers of amine and epoxy groups respectively relative to the number of carbon atoms per molecule. Another approach is to employ polyepoxides having more than two epoxy groups per molecule, thereby increasing the number of hydroxyl groups per molecule resulting from reaction of the epoxy groups. Additionally, it is advantageous to select a polyepoxide that includes amine functionality as well, examples of which have been disclosed above. Reaction of an epoxy group produces a hydroxyl group, but additional hydroxyl functionality can be contributed to the reaction product by reactants that already include hydroxyl groups. Glycidol, disclosed as one of the epoxides that may be used in the present invention falls into this category, but is relatively costly. A more practical approach has been found to be the inclusion of an alkanolamine, such as diethanolamine, as an additional reactant. The alkanolamine may be included in sufficient quantity to react with a portion of the epoxy groups of the polyepoxide, thereby adding both amine and hydroxyl groups to the reaction product, leaving some of the epoxy groups unreacted and available for reaction with the polyamine or the amine functional adduct. Larger alkanolamines than diethanolamine may be used, but it is preferred to keep the carbon content low so as to not dilute the amine and hydroxyl concentrations in the final reaction product. Polyepoxides having more than two epoxy groups per molecule are preferred for reacting with alkanolamines, whereby the reaction with the alkanolamine can be effected while leaving diepoxy functionality for subsequent crosslinking with the polyamine or adduct. Use of alkanolamines in this manner was found to yield substantial reductions in oxygen permeability and particularly significant reductions in carbon dioxide permeability.

The present invention is further concerned with packaging materials and containers formed of a barrier material or packaging materials and containers including a barrier material. Such packaging materials and/or containers would be desired to have some or all of the following properties: (1) low oxygen permeability, e.g., for the protection of package contents such as food from external oxygen, (2) low carbon dioxide permeability, e.g., for the retention of carbon dioxide gas within a container, (3) good adhesion to gas-permeable polymeric materials used in forming multilayer packaging materials or multilayer containers, (4) retortability, i.e., the ability to withstand wet autoclaving at temperatures up to about 130° C. (the temperature of saturated steam), without blushing, loss of oxygen or carbon dioxide impermeability, or loss of adhesion, (5) good flexibility, (6) high impact resistance, (7) low processing and cure temperatures for use with heat-sensitive substrates, e.g., certain gas-permeable polymeric materials, (8) high gloss, and (9) good clarity. In addition, the barrier materials utilized in packaging materials or containers of this invention can be and are preferably characterized as halide-free.

In the packaging materials and containers of the present invention, barrier materials formed from the coating compositions of the present invention may be used in combination with any polymeric material used in conventional packaging materials and containers, e.g., polyolefins such as polyethylene or polypropylene, polyesters such as poly(ethylene terephthalate), polycarbonates and the like. Many polymeric materials, such as, e.g., polyolefins and polycarbonates, are known to be very gas-permeable. The term "gas-permeable" is used herein to mean that such a polymeric material has a gas permeability greater than that of the barrier materials. Gas-permeable polymeric materials are generally more limited for use as packaging of oxygen-sensitive foods or beverages, or for packaging of carbonated beverages. The herein described barrier materials are especially suitable for use in combination with polymeric materials such as polyolefins or polycarbonates. Polyolefins and polycarbonate materials have both high oxygen permeabilities and carbon dioxide permeabilities, i.e., values generally greater than 100 cubic centimeters (cc) of oxygen and greater than 250 cc of carbon dioxide permeating a one-mil thick sample, 100 inches square over a 24-hour period under an oxygen or carbon dioxide partial pressure differential respectively of one atmosphere (100 cc-mil/100 in$^2$-day-atmosphere) at 23° C. and a relative humidity of zero. The containers or packaging materials of this invention may also incorporate one or more other polymeric materials such as, e.g., polyvinylidene chloride, polyacrylonitrile, polystyrene, acrylonitrile-styrene copolymers, polyamides, polyfluorocarbons, and blends or other combinations of such materials.

The barrier materials can be applied as either solvent or aqueous-based thermosetting coating compositions onto other polymeric materials, e.g., packaging materials or containers, by any conventional means such as spraying, rolling, dipping, brushing and the like. Spray applications or roll applications are preferred. For example, conventional spray techniques and equipment for applying curable coating components can be utilized.

Generally, the solution of the amine-functional polymeric resin ready for application will have a weight percent of resin solids in the range of from about 15 percent by weight to about 50 percent by weight, preferably from about 25 to about 40 percent by weight for embodiments employing the prereacted adduct approach. Higher weight percent solids may present application difficulties, particularly with spray application, while lower weight percentages will require removal of greater amounts of solvent during a heat-curing stage. For the embodiments using direct reaction of the polyamine and polyepoxide, solids contents above 50 percent can be applied successfully.

The amine-functional polymeric resin should contain sufficient amine functionality so that the barrier coating will contain at least about seven percent by weight amine nitrogen, and preferably at least about ten percent by weight amine nitrogen as described hereinabove. While not wishing to be bound by theory, it is believed that greater levels of amine nitrogen in the barrier material contributes to adhesion of the barrier materials to other polymeric materials, e.g., gas-permeable polymeric materials.

Coating compositions of this invention can further include other additives including pigments, catalysts for coating Compositions which involve an epoxy-amine reaction, silicones or surfactants. For example, the addition of pigments can further reduce the gas permeability of the resultant barrier material. Among the useful pigments in decreasing the gas permeabilities may be included titanium dioxide, micas, silica pigments, talc and aluminum or glass particulates, e.g., flakes. Micas, aluminum flakes and glass flakes may be preferred due to a plate-like structure of such pigments. Generally, when pigments are included in the coating compositions, the weight ratio of pigment to binder is about 1:1, preferably about 0.3:1, and more preferably about 0.05:1, the binder weight being the total solids weight of the polyamine-polyepoxide resin in the coating composition.

Silicones may be included in coating compositions of this invention to assist in wetting of gas-permeable polymeric surfaces. Suitable silicones include various organosiloxanes such as polydimethylsiloxane, polymethylphenylsiloxane and the like. Exemplary are SF-1023 silicone (a polymethylphenylsiloxane available from General Electric Go.), AF-70 silicone (a polydimethylsiloxane available from General Electric Go.), and DF-100 S silicone (a polydimethylsiloxane available from Mazer Chemicals, a division of PPG Industries, Inc.) Such silicones may be added to the coating compositions in amounts of from about 0.01 to about 1.0 percent by weight based on total resin solids in the composition.

Surfactants may be included in aqueous-based coating compositions of the present invention, such as when the ungelled amine-functional polymeric resins are in aqueous solution. Such surfactants may generally be any suitable nonionic or anionic surfactant and may be employed at levels of about 0.01 to about 1 percent by weight basis total weight of the solution.

Among the catalysts which may be included in the coating compositions are those generally used for epoxy-amine reactants such as dihydroxy aromatics (e.g., resorcinol), triphenyl phosphite, calcium nitrate and the like.

When the composition includes pigments and additives, it is desirable for the polyamine-polyepoxide resin in the formulation to contain sufficient amine nitrogen such that the amine nitrogen content as a weight percent basis of the total weight of solids in the composition is at least 7 percent, preferably at least 10 percent.

In application of a thermosetting coating composition onto a substrate to form a layer of a barrier material, the components of a coating composition, e.g., a polyepoxide and the ungelled amine-functional polymeric resin, are first thoroughly mixed and then applied by appropriate means such as spraying. After mixing, the coating composition can also be held for a period of time (referred to as an ingestion time) from about 5 minutes to about 60 minutes prior to application to improve cure and clarity. This ingestion time can generally be eliminated when the polyamine is a preracted adduct of polyepoxide and polyamine or when the solvent is 2-butoxyethanol. After application of the coating composition, it may be cured at temperatures as low as ambient temperature, i.e., about 70° F., by allowing for a gradual cure over several hours to several days or longer. However, such low temperature curing is slower than desired for commercial production lines and is not as efficient in removing solvent from the cured coating. Therefore, it is preferred that the coating be cured by heating at elevated temperatures as high as possible without distorting the plastic substrates and sufficiently high to effectively drive the particular solvent from the coating. For a relatively "slow" solvent, that is, a solvent having a flash point around 140° F. or higher, temperatures from about 130° Fahrenheit (F) to about 230° F., preferably from about 160° F. to about 200° F. for from about 1 minute to about 60 minutes may be suitable. For relatively "fast" solvent, that is, a solvent having a flash point below about 120° F., temperatures in the range of 100° F. to 160° F., preferably from about 120° F. to 150° F., may be suitable. The thermosetting coating composition may be applied and cured as a single layer or may be applied as multiple layers with multiple heating stages to remove solvent from each subsequent layer.

Multilayer packaging materials of the present invention comprise at least one layer of a gas-permeable polymeric material and at least one layer of a barrier material that is the reaction product of a polyepoxide and a polyamine as described herein and characterized as containing at least about seven percent amine nitrogen. In the preparation of the multilayer packaging material, a layer of the gas-permeable polymeric material can be coated with a layer of the barrier material composition, e.g., by roll coating or spraying, and the layer of the coating compositions can then be cured to form the thermoset barrier layer by heating for a sufficient time at sufficient temperatures. The heating temperatures will generally be beneath the temperature at which the gas-permeable polymeric material suffers any detrimental effects, such as distortion, discoloration or degradation. Generally, the coating composition can be cured to the resultant thermoset layer by heating at elevated temperatures as described previously.

In another embodiment of the invention, a laminate including a barrier layer may be formed, e.g., by spray application of the coating composition onto a first layer of a gas-permeable polymeric material. Thereafter, a second layer of a similar or dissimilar gas-permeable polymeric material may be applied over the barrier layer to form a laminate and heated as previously described or optionally heated under pressure. For example, such a laminate may be pressed under pressures of from about 5 to about 200 pounds per square inch (psi).

In a preferred embodiment of a multilayer packaging material in accordance with the present invention, polypropylene is the gas-permeable polymeric material. The surface of the polypropylene (or any other polyolefin) is preferably treated to increase surface tension by, e.g., flame-treating, corona-treating and the like, all of which are well known to those skilled in the art. Such treatments are described in detail by Pinner et al. in *Plastics; Surface and Finish*, Butterworth & Co. Ltd. (1971), Chapter 3, on surface treatments for plastic films and containers, and this description of surface treatments is herein incorporated by reference. Such treatments promote better adhesion of the barrier layer to polyolefin material.

The barrier layer in this example is formed upon the treated polypropylene from a coating composition including, e.g., a polyepoxide such as a diglycidyl ether of bisphenol A as one component and, as a second component, a solution containing about 20 percent by weight of an ungelled amine-functional polymeric resin comprised of the reaction product of a diglycidyl ether of bisphenol A and tetraethylenepentamine, such ungelled amine-functional polymeric resin having a number average molecular weight of about 3600 and an amine nitrogen content of about 13.7, based on total weight of solvent and resin in solution, the solvent being 1-methoxy-2-propanol. The two-package coating composition is mixed and either rolled or sprayed onto the treated polypropylene to give about a one-mil thick coating of the barrier material. The layer of barrier material coating is cured by heating at about 160° F. for about 10 minutes.

The above-described multilayer packaging materials may be formed into containers by conventional plastic processing techniques. For example, sheets, films, and other structures may be formed by well known lamination or extrusion techniques. Film or sheet material made from the multilayer packaging material may be formed into articles such as wrappers, bags and the like. Molded containers may be made from the above-described packaging materials by blow molding the packaging material or by other such molding techniques all of which are well-known in the art.

Optionally, containers including at least one layer of a gas-permeable polymeric packaging material can be preformed into any desired shape and then at least one layer of a barrier coating of the present invention can be applied onto the preformed container in a similar manner as described for the multilayer packaging materials. The multilayer containers and multilayer packaging materials of the present invention are ideally suited for packaging of food, beverages, medicines and like substances. The principal advantage of the packaging materials and containers of this invention is the overall reduction in the transport of gases through the container walls. To achieve this reduction it is not necessary that the entire surface area of the container be coated with the barrier material. The barrier materials of the preferred embodiments of the present invention are capable of such significant reductions in permeability that coating, for example, only about 50 percent or less of the container's surface area may yield a major increase in self life of the product. Coating only a portion of the surface area is advantageous in that the coating process may be simplified by applying the barrier material only onto areas of the container that are relatively easy to coat, such as the vertical side walls. The barrier material may also be limited to areas on the container that are to be covered by a label or other opaque material, thereby lessening the appearance requirements for the barrier material. The lower the permeability of the uncoated packaging material, the smaller the area that need be coated with the barrier material of the present invention. For example, containers of poly(ethylene terephthalate) have sufficiently good barrier properties that they are particularly suitable for partial coatings of the barrier material.

The multilayer packaging material and containers of the present invention do not require the use of adhesives, tie layers or the like between the respective gas-permeable polymeric materials and the barrier materials.

While barrier materials of this invention have been described as useful as coatings on a variety of gas permeable polymeric materials, it should be readily apparent to those reading this specification that such barrier materials may be utilized otherwise than with gas permeable polymeric materials and may be useful, e.g., as coatings on metal surfaces where contact with, e.g., oxygen, is sought to be minimized.

Such barrier materials may also be used without any other polymeric material. For example, such barrier materials may be formed into thin films such as those films commonly sold for home use storage of, e.g., food items in refrigerators and/or freezers.

The present invention is more particularly described in the following examples which are intended as illustration only since numerous modifications and variations will be apparent to those skilled in the art. Examples A–J describe the preparation of the ungelled amine-functional polymeric adducts that are polyamine-polyepoxide reaction products or polyamine-polyacrylate reaction products, which adducts are subsequently cured to form the barrier materials by reaction with additional polyepoxide.

TESTING PROCEDURES

Oxygen permeabilities, i.e., oxygen gas transmission rates through plastic films, composites and/or laminates were determined in accordance with ASTM D-3985-81.

Carbon dioxide permeabilities, i.e., carbon dioxide transmission rates through plastic films, composites and/or laminates were determined using a MULTI-TRAN 800 film permeation test system, available from Modern Controls, Inc. (Minneapolis, Minn.). Such a test system utilizes a thermal conductivity detector for gas sample analysis with helium as the carrier gas. All test gases were dried via appropriate means so that the test conditions were at zero percent relative humidity.

EXAMPLE A

An ungelled amine-functional polymeric resin (an epoxy-amine adduct), was prepared by the following procedure: A reaction vessel was charged with one mole (146 grams (g)) of triethylenetetramine (TETA) and 897 g of 1-methoxy-2-propanol, available from Dow Chemical Company as DOW-ANOL PM (14 percent by weight TETA in the total charge), and the admixture was heated to 100° C. under a nitrogen atmosphere. A mixture of 0.85 mole (320 g) of a diglycidyl ether of bisphenol A (available as EPON 828 from Shell Chemical Corporation (molecular weight of 376.47)) and 1963 g of 1-methoxy-2-propanol was then gradually, added over one hour. The reaction mixture was held at 100° C. for two hours, followed by heating at 110° C. to strip solvent. The resultant product had a theoretical molecular weight of about 3200, a percent solids as measured at 110° C. for one hour of 39.9 percent and a theoretical amine nitrogen content of about 12.3 percent basis total resin solids.

EXAMPLE B

Example A was repeated with the exception that 2-butoxyethanol was the solvent. The unstripped product had a measured total solids of 15.1 percent.

EXAMPLE C

An ungelled amine-functional polymeric adduct was prepared as follows: A reaction vessel was charged with 146 g of TETA and 584 g of 1-methoxy-2-propanol, and the admixture was heated under nitrogen to 100° C. A mixture of 172 g of a 1,4-diglycidyl ether of butanediol (available as ARALDITE RD-2 from Ciba-Geigy Corporation) and 687 g of 1-methoxy-2-propanol was gradually added over one hour. The reaction mixture was held at 100° C. for two hours, followed by heating at 110° C. to strip solvent. The resultant product had a theoretical molecular weight of about 2200, a percent solids as measured at 110° C. for one hour of 29.2 percent and a theoretical amine nitrogen content of about 17.8 percent basis total resin solids.

EXAMPLE D

Example C was repeated with the exceptions that 2-butoxyethanol was the solvent and the amounts of materials were doubled. The unstripped product had a measured total solids of 18.68 percent.

EXAMPLE E

An ungelled amine-functional polymeric adduct was prepared as follows: A reaction vessel was charged with 1.2 moles (123.6 g) of diethylenetriamine (DETA) and 700 g of 1-methoxy-2-propanol. The admixture was heated under nitrogen to 100° C. and a mixture of 1.02 mole (384 g) of EPON 828, and 2173 g of 1-methoxy-2-propanol was added over one hour. The reaction mixture was held at 100° C. for a total of about two hours, followed by heating at 110° C. to strip solvent. The resultant product had a theoretical molecular weight of about 3000, a percent solids as measured at 110° C. for one hour of 32.5 percent and a theoretical amine nitrogen content of about 9.8 percent basis total amine solids.

EXAMPLE F

Example E was repeated with the exception that 2-butoxyethanol was the solvent. The unstripped product had a measured total solids of 15.31 percent.

EXAMPLE G

An ungelled polymeric adduct was prepared as follows: A reaction vessel was charged with 1 mole (189 g) of tetraethylenepentamine (TEPA) and 1161 g of 1-methoxy-2-propanol. The admixture was heated under nitrogen to 100° C., and a mixture of 0.857 mole (322.2 g) of EPON 828 epoxy and 1979 g of 1-methoxy-2-propanol was added over one hour. The reaction mixture was then held at 100° C. for a total of about two hours, followed by vacuum stripping of solvent at about 80° C. The resultant product had a theoretical molecular weight of about 3600, a percent solids as measured at 110° C. for one hour of 30.1 percent, a theoretical equivalent weight per amine hydrogen of 96.7 g and a theoretical amine nitrogen content of about 13.7 percent basis total resin solids.

EXAMPLE H

Example G was repeated with the exception that 2-butoxyethanol was the solvent. The unstripped product had a measured solids of 15.0 percent.

EXAMPLE I

An ungelled amine-functional polymeric resin (an amine-acrylate adduct) was prepared as follows: A reaction vessel was charged with 146 g of TETA and 584 g of 2-butoxyethanol, and the admixture was heated under nitrogen to about 100° C. A mixture of 169.5 g of 1,6-hexanediol diacrylate (0.75 mole) and 678 g of 2-butoxyethanol was gradually added over one hour. The reaction mixture was held at 100° C. for two hours. The resultant product had a theoretical molecular weight of about 1262, a theoretical equivalent weight per amine hydrogen of 70.1, a theoretical amine nitrogen content of 17.7 percent, and a percent solids as measured at 110° C. for one hour of 18.5 percent. Such an amine-acrylate adduct may be crosslinked with, e.g., a polyepoxide to yield a thermoset barrier material.

EXAMPLE J

An ungelled polymeric adduct was prepared as follows: A reaction vessel was charged with 1 mole (189 g) of tetraethylenepentamine (TEPA) and 1161 g of 1-methoxy-2-propanol. The admixture was heated under nitrogen to 100° C., and a mixture of 0.857 mole (322.2 g) of EPON 828 epoxy and 1979 g of 1-methoxy-2-propanol was added over one hour. The reaction mixture was then held at 100° C. for a total of about two hours, followed by vacuum stripping at about 80° C. The resultant product had a percent solids as measured at 110° C. for one hour of 25.2 percent, a theoretical equivalent weight per amine hydrogen of 96.7 g and a theoretical amine nitrogen content of about 13.7 percent basis total resin solids.

This adduct was then reacted with a monoepoxide thereby reducing the amine equivalents in the product as follows: A total of 500 g of the adduct at 25.2 percent by weight resin solids in 1-methoxy-2-propanol was charged into a reaction vessel equipped with a nitrogen sparge. The charge was heated to about 50° C., whereupon 28.9 g of glycidol was slowly added dropwise while maintaining the resultant exotherm under 100° C. After the glycidol addition was complete, the reaction mixture was heated at 100° C. for one hour. The resultant product has a percent solids as measured at 110° C. for one hour of 31.6 percent, a theoretical equivalent weight per amine hydrogen of 169.8 g and a theoretical amine nitrogen content of 11.1 percent basis total resin solids.

Examples 1–8 illustrate the preparation of the thermoset barrier materials having varying degrees of gas barrier properties. Example 9 illustrates the solvent barrier properties of the thermoset barrier materials.

EXAMPLE 1

Barrier materials were coated onto a polypropylene sheet at various equivalent ratios of polyepoxide to amine-functional material.

EXAMPLE 1a

A one-mil thick film of polypropylene with one corona-treated surface having a surface tension of about 40 to 42 dynes/centimeter (available from Phillips Joanna, a division of Joanna Western Mills Company as PJX-2135 polypropylenefilm) was coated with a two-package coating composition including: (1) the ungelled amine-functional polymeric adduct from Example G and (2) a diglycidyl ether of bisphenol A having an epoxy equivalent weight of about 188 (available as EPON 828 from Shell Chemical Company). The ungelled amine-functional polymeric adduct (75 grams total of a 30.1 percent by weight resin solution in 1-methoxy-2-propanol) was stirred with a high-intensity mixer as 43.9 g of EPON 828 epoxy was added. The equivalent ratio of epoxy groups to amine hydrogen equivalents in this mixture was about 1:1. The mixture was held for 20 minutes and then about a one-mil thick coating layer was drawn down by a roll bar onto the treated surface of the polypropylene. The coated film was heated at 160° F. (about 71° C.) for 20 minutes and yielded a flexible, clear film of the barrier material having a high gloss. The coated film was tested for oxygen and carbon dioxide permeabilities and the results are given in Table 1.

EXAMPLE 1b

A one-mil thick film of polypropylene as in Example 1a was coated with the two-package coating composition as above except the amount of EPON 828 epoxy was reduced to 23.7 g. The equivalent ratio of epoxy groups to amine hydrogen equivalents in this mixture was 0.54:1. The coated film, drawn down and heated as above, yielded a flexible, clear film of the barrier material having a high gloss. A sample of this coating sprayed onto a titanium dioxide-pigmented polypropylene substrate at a thickness of about 0.8 to about 1.0 mils and heated for 20 minutes at 160° F. had a gloss of 40 to 45 percent at 20° and of 100 to 110 percent at 60° in comparison to 9 percent and 30 percent respectively for the uncoated polypropylene substrate. Gloss measurements were made with gloss meters manufactured by the Gardner Instrument Company. The results of testing for oxygen and carbon dioxide permeabilities are given in Table 1.

EXAMPLE 1c

A one-mil thick film of polypropylene as in Example 1a was coated with the two-package coating composition as above except the amount of EPON 828 epoxy was reduced to 11.86 g. The equivalent ratio of epoxy groups to amine hydrogen equivalents in this mixture was 0.27:1. The coated film, drawn down and heated as above, yielded a flexible, clear film of the barrier material having a high gloss. The results of testing are given in Table 1.

EXAMPLE 1d

A one-mil thick film of polypropylene as in Example 1a was coated with a two-package coating composition including: (1) an ungelled amine-functional polymeric adduct similar to that of Example G and (2) EPON 828 epoxy. The ungelled amine-functional polymeric adduct (50 g total of a 28.0 percent by weight resin solution in 1-methoxy-2-propanol) was stirred with a high-intensity mixer as 3.67 g of EPON 828 epoxy was added, followed by addition of 0.088 g (0.5 percent by weight on total resin solids in solution) of polydimethylsiloxane (available as SF-1023 from General Electric Go.) The equivalent ratio of epoxy groups to amine hydrogen equivalents in this mixture was about 0.135:1. The mixture was applied and heated as in Example 1a except two layers, each about 0.4 to 0.5 mils thick, were sequentially drawn down and heated. The resultant barrier film was clear, flexible and had a high gloss. The coated film was tested for oxygen and carbon dioxide permeabilities and the results are given in Table 1.

EXAMPLE 1e

A one-mil thick film of polypropylene as in Example 1a was coated with a two-package coating composition including: (1) an ungelled amine-functional polymeric adduct of Example J except the solvent was 2-butoxyethanol and (2) EPON 828 epoxy. The ungelled amine-functional polymeric adduct (50 g total of a 31.6 percent by weight resin solution) was stirred as 3.67 g of EPON 828 epoxy was added, followed by addition of 0.097 g SF-1023 silicone. The equivalent ratio of epoxy groups to amine hydrogen equivalents in this mixture was about 0.21:1. The mixture was applied and heated as in Example 1a to give a resultant clear barrier film having high gloss, good flexibility and a dried film thickness of barrier material of about 0.6 to 0.7 mils. The coated film was tested for oxygen and carbon dioxide permeabilities and the results are given in Table 1.

COMPARATIVE EXAMPLE 2

A polypropylene film as in Example 1 was coated with a mixture of a commercially available epoxy-amine adduct and EPON 828 epoxy. These reactants were mixed as follows so as to yield a 1:1 equivalent ratio of epoxy groups to amine hydrogen equivalents. The epoxy-amine adduct (50 g total of a 42 percent by weight resin solids solution available as C-112 epoxy curing agent from Shell Chemical Company) was mixed with 47 g of the EPON 828 epoxy. The coated film, drawn down and heated as in Example 1, gave a flexible, clear coating. The testing results on this coated film and those of an uncoated samples of the polypropylene are given in Table 1.

TABLE 1

| Example | % Amine N in Coating | (cc-mil/100 in$^2$-day-atmosphere at 23° C. and 0% R.H.) | |
|---|---|---|---|
| | | $O_2$ Permeability | $CO_2$ Permeability |
| 1a | 4.65 | 3.1 | 13.9 |
| 1b | 6.7 | 2.9–3.4 | 9.6–10.7 |
| 1c | 9.0 | 2.1 | 2.8–3.1 |
| 1d | 10.9 | 0.5 | 0.0 |
| 1e | 9.0 | 0.1 | 0.2 |
| Comp. 2 | 3.55 | 5.5 | — |
| Polypropylene (uncoated) | — | 155 | — |

EXAMPLE 3

Samples of the corona-treated polypropylene film as in Example 1 were coated with a two-package coating composition including: (1) the ungelled amine-functional polymeric adduct from Example D and (2) EPON 828 epoxy. These reactants were mixed as follows: the ungelled amine-functional polymeric adduct (50 grams total of an 18.68 percent by weight resin solution in 2-butoxyethanol) was mixed with 23.8 g of the EPON 828 epoxy to form a coating composition, and heated as in Example 1 with the exception that heating was for 30 minutes. One coated film sample was clamped between two pieces of expanded aluminum metal and placed in boiling water for about one hour to study the effect of retort. Adhesion between the barrier material and the polypropylene was unaffected. Results of the testing on samples before and after retort are given in Table 2.

EXAMPLE 4

Samples of polypropylene film were coated as in Example 1 with a two-package coating composition including: (1) the ungelled amine-functional polymeric adduct of Example F and (2) a diglycidyl ether of butanediol having an epoxy equivalent weight of 102 (available as ARALDITE RD-2 from Ciba-Geigy Corporation). These reactants were mixed as follows: the ungelled amine-functional polymeric adduct (50 g total of a 15.31 percent by weight resin solution in 2-butoxyethanol) was mixed with 6.1 g of the RD-2 epoxy to form a coating composition, which was drawn down and heated as in Example 3. One coated film sample was subjected to boiling water as in Example 3 and results of testing on the samples are given in Table 2.

EXAMPLE 5

A polypropylene film was coated as in Example 3 with a two-package coating composition including: the ungelled amine-functional polymeric adduct of Example B and RD-2 epoxy. These reactants were mixed as follows: the ungelled amine-functional polymeric adduct (50 g total of a 15.1 percent by weight resin solution in 2-butoxyethanol) was mixed with 7.14 g of the RD-2 epoxy to form a coating composition which was drawn down and heated as in Example 3. Results of testing on the coated film are in Table 2.

EXAMPLE 6

A polypropylene film was coated as in Example 3 with a two-package coating composition including: (1) the ungelled amine-functional polymeric adduct of Example B and (2) a blend of aromatic and aliphatic epoxies. These reactants were mixed as follows: the ungelled amine-functional polymeric adduct (50 grams total of a 15.1 percent by weight resin solution in 2-butoxyethanol) was mixed with 0.38 epoxy equivalents of RD-2 epoxy and 0.62 epoxy equivalents of EPON 828 epoxy per one amine hydrogen equivalent (a total of 2.88 g RD-2 epoxy and 8.77 g of EPON 828 epoxy) to form a coating composition which was drawndown and heated as in Example 3. Results of testing are given in Table 2.

EXAMPLE 7

A polypropylene film was coated as in Example 3 with a two-package coating composition including: (1) the ungelled amine-functional polymeric adduct of Example B and (2) a 1 to 1 by epoxy equivalents blend of an aromatic and an aliphatic epoxy. These reactants were mixed as follows: the ungelled amine-functional polymeric adduct (50 g total of an 18.68 percent by weight resin solution in 2-butoxyethanol) was mixed with 6.45 g of RD-2 epoxy and 11.38 g of EPON 828 epoxy to form a coating composition as in Example 3 which was drawn down and heated as in Example 3. Results of testing on the coated film are given in Table 2.

TABLE 2

| Example | % Amine Nitrogen in Coating | Coating Film Thickness (mils) | $O_2$ Permeability (cc-mil/100 $in^2$-day-atm at 23° C. and 0% R.H.) | | Adhesion Loss (percent) |
| --- | --- | --- | --- | --- | --- |
| | | | before retort | after retort | |
| 3 | 4.97 | 0.3–0.35 | 2.8 | 2.7 | 0 |
| 4 | 6.00 | 0.1–0.15 | 1.8 | 1.7 | 0 |
| 5 | 6.20 | 0.1 | 1.2 | — | 0 |
| 6 | 4.78 | 0.25 | 2.6 | — | 0 |
| 7 | 5.94 | 0.65 | 2.8 | — | 0 |

EXAMPLE 8

Corona-treated polypropylene film samples were coated with a composition consisting of 18.7 g of an ungelled amine-functional polymeric adduct (prepared from a ratio of TETA to RD-2 epoxy of 7:6 in 81.3 g of 2-butoxyethanol), and a blend of polyepoxides (12.9 g of RD-2 epoxy and 23.8 g of EPON 828 epoxy), and optionally titanium dioxide pigment to give clear or colored barrier coatings. Application of the coating composition was by drawing down onto the polypropylene film. The coated films were then baked for 20 minutes at 160° F. Results of testing these samples is shown in Table 3 and demonstrate the reduction of oxygen permeability by addition of pigment.

TABLE 3

| | Parts by Weight (grams) | |
| --- | --- | --- |
| | 1A | 1B |
| Coating Ingredients | | |
| Ungelled amine-functional polymeric resin | 18.7 | 18.7 |
| 2-butoxyethanol | 81.3 | 81.3 |
| Polyepoxide blend | 36.7 | 36.7 |
| Titanium dioxide | — | 55.33 |
| Properties | | |
| Coating film thickness | 0.8–1.2 | 0.8–1.0 |
| $O_2$ permeability (cc-mil/100 $in^2$-day-atm) | 3.4 | 1.9 |
| Adhesion (% loss) | 0 | 1 |
| Adhesion after retort (% loss) | 0 | 10 |

EXAMPLE 9

A coating was applied to a high-density polyethylene bottle that had been surface-treated on the interior surfaces by a fluoridation process as described in U.S. Pat. No. 3,862,284 with the exception that a small amount of oxygen was added to the fluorine-containing nitrogen stream to provide a fluoridation/oxidation of the bottle surface. The interior bottle surface had a surface tension of about 50 dynes/centimeter. The coating included an ungelled amine-functional polymeric adduct similar to Example C (the resin having a theoretical molecular weight per amine hydrogen of 7.39), a tetrafunctional sorbitol-based polyepoxide having an epoxy equivalent weight of 172 (available as ARALDITE XU GY 358 aliphatic polyepoxide from Ciba-Geigy Corporation), and a small amount of a red dye to check uniformity of the resultant coating. The ungelled polymeric adduct (20.2 g of a 29.7 percent by weight solution in 1-methoxy-2-propanol) was stirred with a high-intensity mixer as 14.0 g of the polyepoxide was added. The interior of the bottle was coated by dipping in the coating composition, allowing excess coating composition to drain off and heating at 200° F. for 15 minutes.

One bottle with a 0.4 mil thick coating, one bottle with a 1.0 mil thick coating and an uncoated bottle were each filled with a methylene chloride-containing composition (Paint Stripper No. 99 from Red Devil). After 50 days at ambient temperature, the uncoated bottle had a weight loss of about 1.7 to 1.8 percent, the 1.0 mil coated bottle had a weight loss of about 1.5 percent and the 0.4 mil coated bottle had a weight loss of about 0.8 percent. Adhesion of the coatings to the bottles was good both before and after contact with the methylene chloride.

Example 10 describes the preparation of a coating in accordance with an embodiment of the present invention in which polyamine and polyepoxide are blended to form a barrier coating without the step of forming a prereacted adduct.

Examples 10, 11, and 12 involve the non-adduct embodiments of the present invention.

EXAMPLE 10

The following ingredients were mixed together at room temperature, provided with an ingestion period of 15 to 30 minutes.

25.0 grams 1-methoxy-2-propanol (available as Dowanol PM from Dow Chemical Co.)

58.2 grams EPON 828

27.0 grams tetraethylene pentamine 0.01 grams polydimethylsiloxane 0.01 (SF-1023 flow control agent from General Electric)

The mixture was sprayed onto a one mil thick corona treated polypropylene film (Phillips-Joanna PJX-2135) and baked at 200 F. for 20 minutes. The cured film was hard, fairly glossy, 2.8 mils thick, had an amine nitrogen content of 11.7 percent, and a calculated hydroxyl content of 6.18 percent (assuming that the epoxy had fully reacted). After aging a few days, oxygen permeability of the coated film as measured by an Oxtran 1000 from Mocon, Inc., was 0.53 cc-mil/100 in$^2$-day-atmosphere at 5° C.

EXAMPLE 11

The following ingredients were mixed together at room temperature, ingested for 15 to 30 minutes before being sprayed onto corona treated, 1 mil thick Phillips-Joanna PJX-2135 polypropylene film:

30.0 grams Dowanol PM 58.2 grams EPON 828

20.0 grams TETRAD X (N,N,N',N' tetrakis(oxiranylmethyl) 1,3 benzene dimethanamine)

27.0 grams TEPA (tetraethylene pentamine)

5.26 grams GAB 551-0.01 solution (20% solids in methyl ethyl ketone)

0.02 grams SF-1023 polydimethylsiloxane flow control agent from General Electric.

After spraying onto the substrate, the film was baked for 20 minutes as 200° F. and aged for 2 to 3 days at room temperature. The cured film was glossy and hard, had a thickness of 2.8 mils, had a calculated amine nitrogen content of 10.3 percent by weight and a hydroxyl content of 6.07 percent by weight. The cured film was tested in an OXTRAN 1000 permeability analyzer from Mocon, Inc., and the results were 1.3 cc-mil/100 in$^2$-day-atmosphere for oxygen and 0.39 cc-mil/100 in$^2$-day-atmosphere for carbon dioxide.

EXAMPLE 12

The following ingredients were mixed together at room temperature, ingested for 15 minutes before being sprayed onto corona treated, 1 mil thick Phillips-Joanna PJX-2135 polypropylene film:

18.0 grams Dowanol PM 36.0 grams TETRAD X (N,N,N',N' tetrakis(oxiranylmethyl) 1,3 benzene dimethanamine)

13.9 grams TEPA (tetraethylene pentamine)

0.02 grams SF-1023 polydimethylsiloxane flow control agent from General Electric.

After spraying onto the substrate, the film was baked for 20 minutes as 200° F. and aged for several days at room temperature. The cured film was glossy and hard, had a thickness of 1.5 mils, had a calculated amine nitrogen content of 14 percent by weight and a hydroxyl content of 12.3 percent by weight. The cured film was tested in an OXTRAN 1000 permeability analyzer from Mocon, Inc., and the results were 0.07 cc-mil/100 in$^2$-day-atmosphere for oxygen and 0.03 cc-mil/100 in$^2$-day-atmosphere for carbon dioxide.

The following example involves the reaction of a polyepoxide-polyamine adduct with an amine-containing, tetrafunctional polyepoxide.

EXAMPLE 13

50 grams of tetra glycidyl bis(p-amino phenyl)methane (MY-720 from Ciba-Geigy Corp.) were mixed with 15.64 grams butyl Cellosolve (2-butoxyethanol) at room temperature to yield a 70 percent solids mixture. 6.23 grams of the mixture was blended with 50 grams of an adduct which is the reaction product of 7 moles TEPA (tetraethylene pentamine) and 6 moles of EPON 828, the adduct being 33.2 percent solids in Dowanol PM (1-methoxy-2-propanol) solvent. 13.77 grams of butyl Cellosolve was then added. After 10 minutes at room temperature, the mixture was sprayed onto flame treated polypropylene cups from King Plastics Corp. at about 0.9 mil average dry film thickness and given a 200° F. bake for 20 minutes. the cup was soaked in water at 120° F. for three hours without exhibiting blistering or blushing. Another of the coated cups was measured for oxygen permeation on a Mocon OXTRAN device at 71.6° F. and zero relative humidity and a rate of 0.1245 cubic centimeters of oxygen per cup per 24 hours was recorded. This compared to oxygen permeation of an uncoated cup of 2.947 cubic centimeters oxygen per cup per 24 hours. The calculated amine content of the barrier coating of this example was about 12.0 percent, and the calculated hydroxyl content was about 7.36 percent (assuming complete reaction).

The following example illustrates increasing the hydroxyl content of a barrier coating by reacting a portion of the amine functionality in the polyamine with glycidol prior to curing with a polyepoxide.

EXAMPLE 14

An adduct was made by reacting 7 moles of EPON 828 polyepoxide with 6 moles of tetraethylene pentamine in 1-methoxy-2-propanol (Dowanol PM) solvent. 30 percent of the remaining amine hydrogens of the adduct were reacted with glycidol. The resulting modified adduct was 30 percent by weight resin solids. 71.86 grams of the adduct was mixed at room temperature with 2.87 grams N,N,N',N'-tetrakis(oxiranylmethyl)-1,3-benzene dimethanamine (TETRAD X), 25.26 grams 2-butoxyethanol (butyl Cellosolve), and 0.01 gram SF-1023 polydimethylsiloxane flow control agent from General Electric. The composition was sprayed onto 1 mil thick polypropylene film (Phillips-Joanna PJX-2135) and baked at 200° F. for 20 minutes. The resulting film was glossy and hard and had a calculated amine nitrogen content of 10.5 weight percent and a calculated hydroxyl content of 13.5 weight percent assuming complete reaction. The oxygen permeability for the cured film as measured by an OXTRAN 1000 from Mocon Inc. was about 0.15 cc-mil/100 in$^2$-day-atmosphere at 30° C., dry conditions, and 0.10 cc-mil/100 in$^2$-day-atmosphere at 15° C., dry conditions. Carbon dioxide permeability was tested on a PERMATRAN C-IV permeation test device from Mocon, Inc., for a film that had been baked at 140° F. for 20 minutes and was measured to be 0.33 cc-mil/100 in$^2$-day-atmosphere at 25° C.

The following example demonstrates the inclusion of an alkanolamine to increase the amine and hydroxyl group content of the barrier coating.

EXAMPLE 15

An adduct was made by reacting 7 moles of tetraethylene pentamine with 6 moles of EPON 828 polyepoxide in 1-methoxy-2-propanol (Dowanol PM). AT 33.5 percent total solids, 230.92 grams of this adduct was mixed with 21.0 grams of diethanol amine. To this mixture was added 36.10 grams of TETRAD X, 108.75 grams of additional Dowanol PM, and 111.18 grams of 2-butoxyethanol (butyl Cellosolve). This composition was 25.0 percent total solids, had a theoretical amine nitrogen content of 11 weight percent of the solid reaction product, and had a theoretical hydroxyl content of 12.9 weight percent. The solvent ratio was 65/35 on a weight basis Dowanol PM/butyl Cellosolve. The composition was applied to 1 mil polypropylene film and baked 15 minutes at 140° F. The film was glossy and hard, and when tested after several days aging at room temperature exhibited oxygen permeability of 0.6 cc-mil/100 $in^2$-day-atmosphere at 30° C., dry conditions, and exhibited carbon dioxide permeability of 0.2 cc-mil/100 $in^2$-day-atmosphere at 30° C., dry conditions.

The following example demonstrates the improvement in barrier properties yielded by the inclusion of a small amount of water during the epoxy-amine reaction.

EXAMPLE 16

This example is the same as Example 15, except that at the point when the TETRAD X was added to the mixture, 6.72 grams of deionized water was also added. The resulting oxygen permeability of the film was 0.31 cc-mil/100 $in^2$-day-atmosphere at 30° C., dry conditions, and the carbon dioxide permeability was 0.03 cc-mil/100 $in^2$-day-atmosphere at 30° C., dry conditions.

The following example shows an embodiment in which an alkanolamine was used in a preliminary step to partially defunctionalize a high functionality polyepoxide, thereby adding both amine and hydroxyl groups to the polymer.

EXAMPLE 17

An amine functional adduct was prepared by first reacting 2 moles of diethanolamine with 1 mole of a tetra-functional epoxy (TETRAD X) to yield a diepoxy intermediate. One mole of this intermediate was reacted with 7 moles of tetraethylene pentamine in Dowanol PM, and the resulting adduct was characterized by 20.6 percent total solids content, 16.6 weight percent theoretical amine nitrogen content, 16.4 weight percent theoretical hydroxyl content, and an active amine hydrogen equivalent weight of 134.5. A mixture was made of 67.1 grams of this adduct with 9.5 grams of Dowanol PM, 30.92 grams of butyl Cellosolve, and 0.06 grams of SF-1023 polysiloxane. The mixture was sprayed onto a 1 mil thick film of polypropylene and baked for 10 minutes at 200° F., whereupon the film exhibited oxygen permeability of 0.5 cc-mil/100 $in^2$-day-atmosphere at 30° C., dry conditions. This film has a theoretical amine nitrogen content of 13 weight percent and a theoretical hydroxyl content of 16.5 weight percent.

Although the present invention has been described with reference to specific details for the sake of enabling those of skill in the art to practice particular embodiments thereof, it is not intended that such details should be regarded as limitations upon the scope of the invention, except to the extent they are included in the accompanying claims.

We claim:

1. A container having an inner surface and an outer surface, the container comprising:
   (a) at least one layer of a gas-permeable polymeric material; and
   (b) at least one layer of a polymeric gas barrier material comprised of an ungelled amine-functional polymeric resin which is a reaction product of a polyamine and polyepoxide, the polymeric gas barrier material containing at least seven percent by weight amine nitrogen based on total weight of the polymeric ungelled amine-functional polymeric resin.

2. The container of claim 1 wherein the barrier layer is situated as the outer surface.

3. The container of claim 1 wherein the barrier layer is situated as the inner surface.

4. The container of claim 1 wherein the gas-permeable polymeric material is a polyolefin.

5. The container of claim 1 wherein the gas-permeable polymeric material is a polycarbonate.

6. The container of claim 1 wherein the gas-permeable polymeric material is a polyester.

7. The container of claim 1 wherein the gas-permeable polymeric material is polyethylene terephthalate.

8. The container of claim 1 wherein the ungelled amine-functional polymeric resin comprises a reaction product of a polyamine having up to about two primary amino nitrogen groups per molecule and a polyepoxide.

\* \* \* \* \*